(12) United States Patent
Masuya et al.

(10) Patent No.: US 11,892,706 B2
(45) Date of Patent: Feb. 6, 2024

(54) OBSERVATION DEVICE

(71) Applicant: HITACHI HIGH-TECH CORPORATION, Tokyo (JP)

(72) Inventors: Akira Masuya, Tokyo (JP); Tadao Yabuhara, Tokyo (JP); Hiroko Fujita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 492 days.

(21) Appl. No.: 16/972,751

(22) PCT Filed: Jun. 20, 2018

(86) PCT No.: PCT/JP2018/023455
§ 371 (c)(1),
(2) Date: Dec. 7, 2020

(87) PCT Pub. No.: WO2019/244275
PCT Pub. Date: Dec. 26, 2019

(65) Prior Publication Data
US 2021/0263262 A1    Aug. 26, 2021

(51) Int. Cl.
*G02B 21/00* (2006.01)
*G02B 7/34* (2021.01)
(Continued)

(52) U.S. Cl.
CPC ............... *G02B 7/34* (2013.01); *G01N 21/55* (2013.01); *G02B 21/0088* (2013.01);
(Continued)

(58) Field of Classification Search
CPC ............... G02B 21/00; G02B 21/0004; G02B 21/0016; G02B 21/0032; G02B 21/0052;
(Continued)

(56) References Cited

U.S. PATENT DOCUMENTS 6,441,894 B1 * 8/2002 Manian .............. G01N 21/6452
356/123
7,109,459 B2 * 9/2006 Kam .................. G02B 7/365
359/383
(Continued)

FOREIGN PATENT DOCUMENTS

EP        3151053 A1    4/2017
JP        09-281384 A   10/1997
(Continued)

OTHER PUBLICATIONS

Supplementary European Search Report for Application No. 18923067.5 dated Jan. 14, 2022.
(Continued)

*Primary Examiner* — Thong Q Nguyen
(74) *Attorney, Agent, or Firm* — MATTINGLY & MALUR, PC

(57) ABSTRACT

An observation device captures images at focal positions inside a sample container with an optical system that includes an objective lens; an objective lens actuator; an irradiation unit; a reflection light intensity detector; a focus controller that positions the focal point of the objective lens on a reflection surface imparting a peak in the reflected light intensity; and a counting unit. The focus control unit drives the objective lens actuator and positions the focal point on a reflection surface when a peak is detected in the reflected light intensity; and the counting unit counts the reflection surface when the focus control unit has positioned the focal point on the reflection surface. The computation unit determines whether or not the focal point is positioned at the focal position, and causes the optical system to capture images if the focal point is positioned at the focal position.

7 Claims, 9 Drawing Sheets

(51) Int. Cl.
*G01N 21/55* (2014.01)
*G02B 21/24* (2006.01)
*G02B 21/36* (2006.01)

(52) U.S. Cl.
CPC .......... *G02B 21/241* (2013.01); *G02B 21/36* (2013.01); *G01N 2201/02* (2013.01); *G01N 2201/0638* (2013.01)

(58) Field of Classification Search
CPC ............... G02B 21/006; G02B 21/008; G02B 21/0088; G02B 21/02; G02B 21/06; G02B 21/24; G02B 21/241; G02B 21/244; G02B 21/34; G02B 21/36; G02B 21/361; G02B 21/367; G02B 7/02; G02B 7/023; G02B 7/04; G02B 7/28; G02B 7/34
USPC .................................................. 359/368–389
See application file for complete search history.

(56) References Cited

U.S. PATENT DOCUMENTS

| 7,646,482 | B2* | 1/2010 | Jiang | G01B 11/06 |
| | | | | 356/326 |
| 7,825,360 | B2* | 11/2010 | Karasawa | G02B 21/34 |
| | | | | 359/383 |
| 9,360,659 | B2* | 6/2016 | Stauffer | G02B 21/241 |
| 2007/0236687 | A1 | 10/2007 | Mikuriya et al. | |
| 2015/0009559 | A1 | 1/2015 | Brooker | |
| 2015/0168212 | A1 | 6/2015 | Yamaguchi | |
| 2017/0205614 | A1 | 7/2017 | Nakano et al. | |
| 2019/0114465 | A1 | 4/2019 | Shibata et al. | |

FOREIGN PATENT DOCUMENTS

| JP | 2001-091821 A | 4/2001 |
| JP | 2005-227098 A | 8/2005 |
| JP | 2007-271979 A | 10/2007 |
| JP | 2008-122629 A | 5/2008 |
| JP | 2008-267842 A | 11/2008 |
| JP | 2011-022327 A | 2/2011 |
| JP | 2016-534401 A | 11/2016 |
| JP | 2017-187436 A | 10/2017 |
| WO | 2014/020967 A1 | 2/2014 |
| WO | 2015/181951 A1 | 12/2015 |

OTHER PUBLICATIONS

International Search Report of PCT/JP2018/023455 dated Sep. 25, 2018.

* cited by examiner

[FIG. 1]
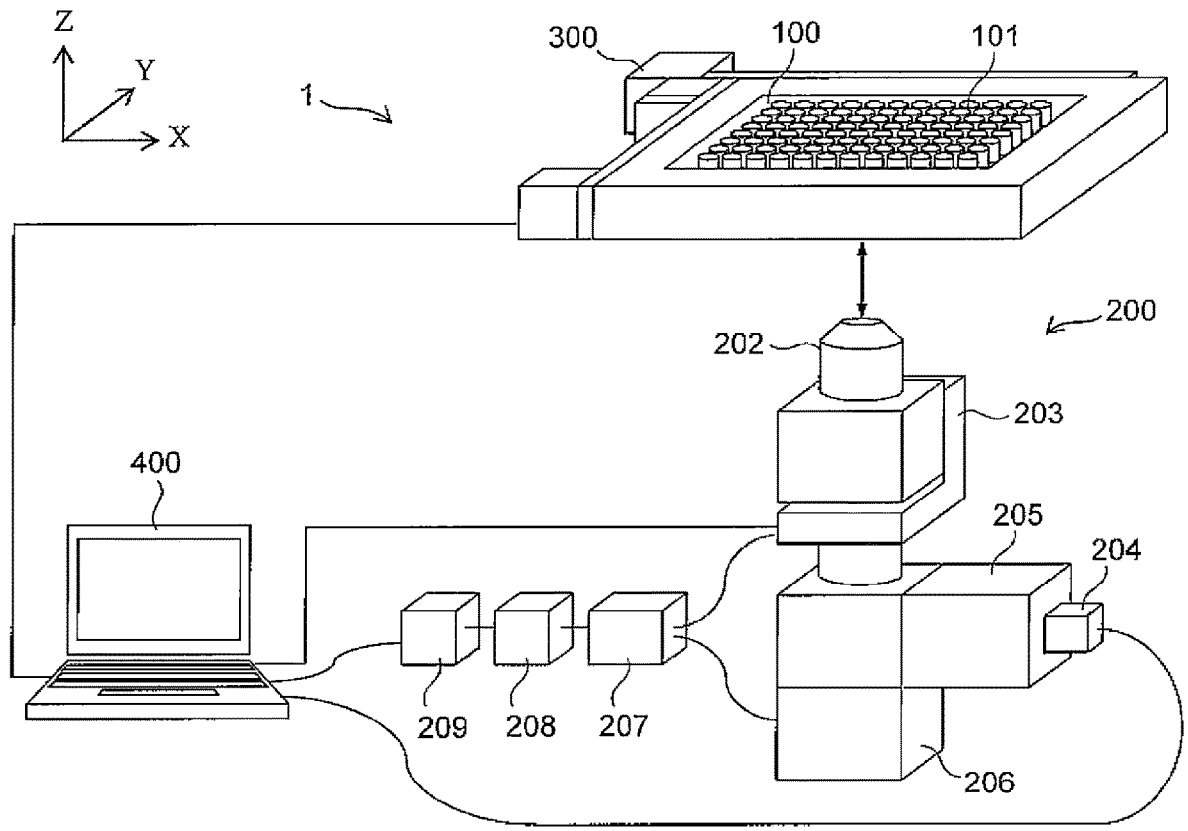
[FIG. 2A]
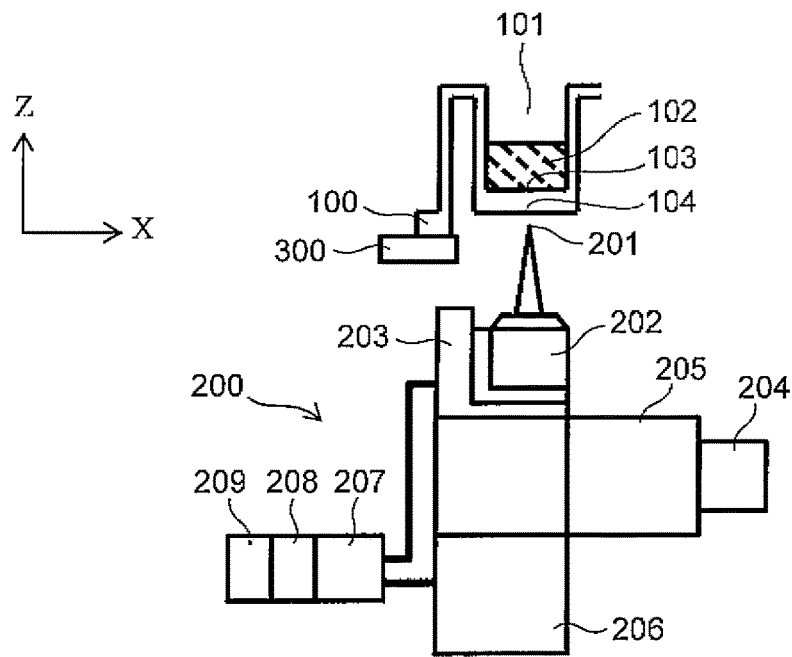

[FIG. 2B]
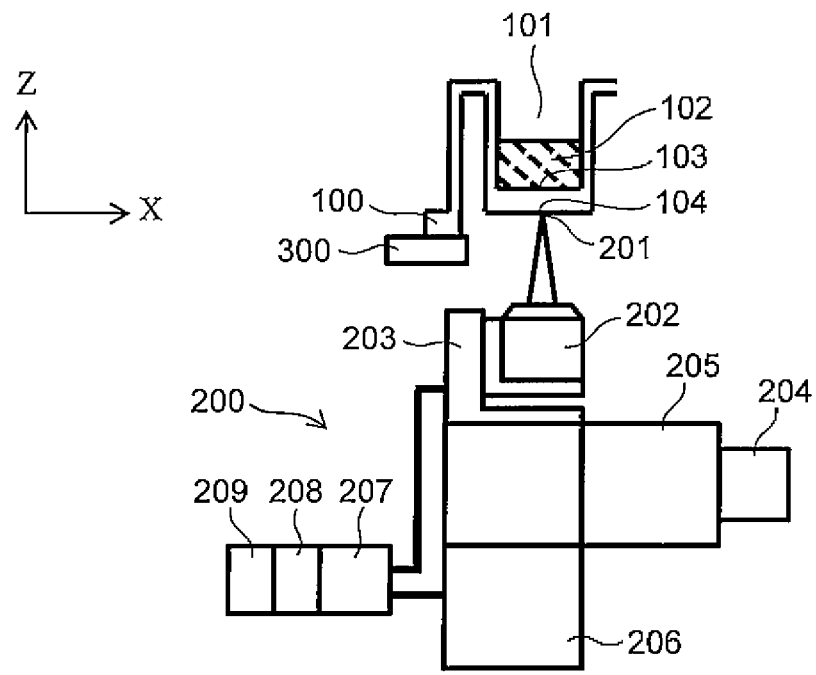
[FIG. 2C]
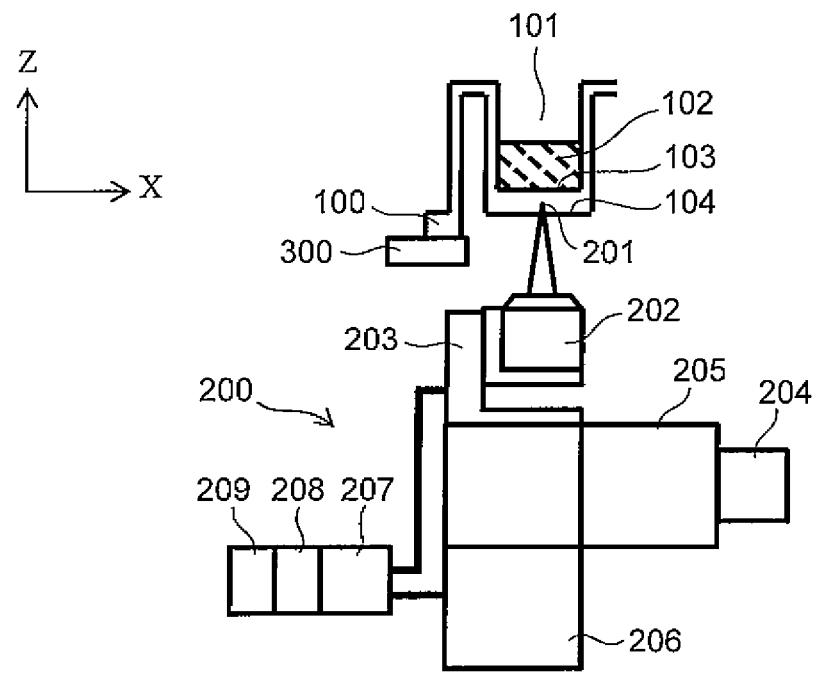

[FIG. 2D]
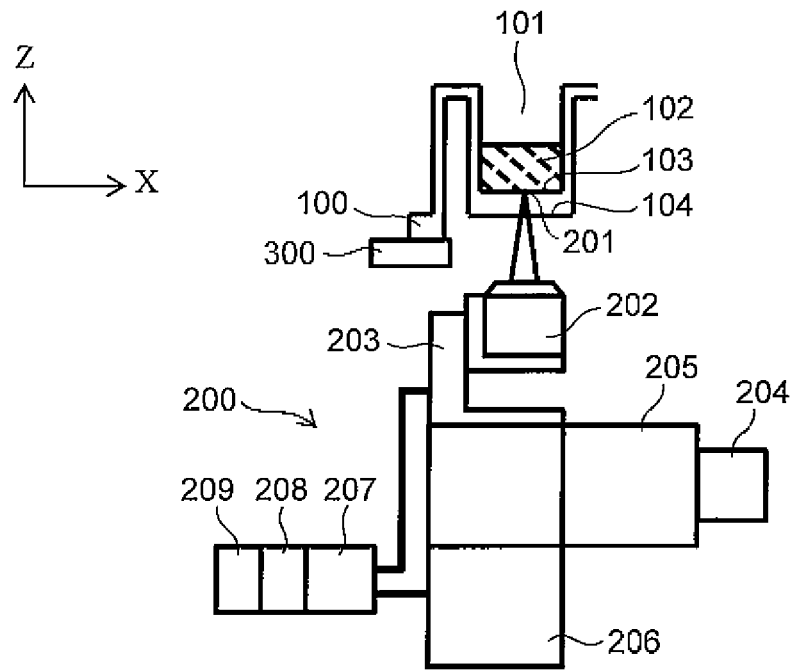
[FIG. 2E]
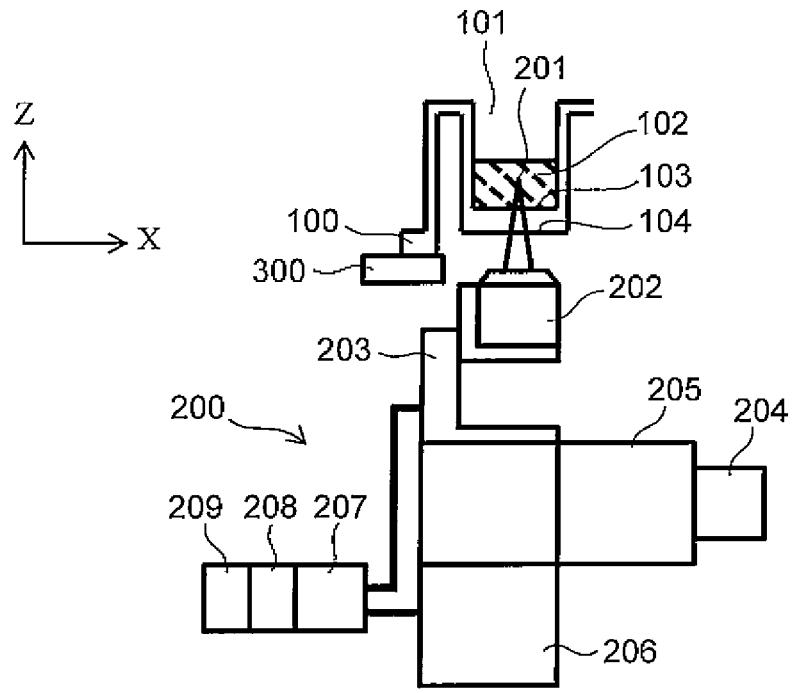

[FIG. 3]
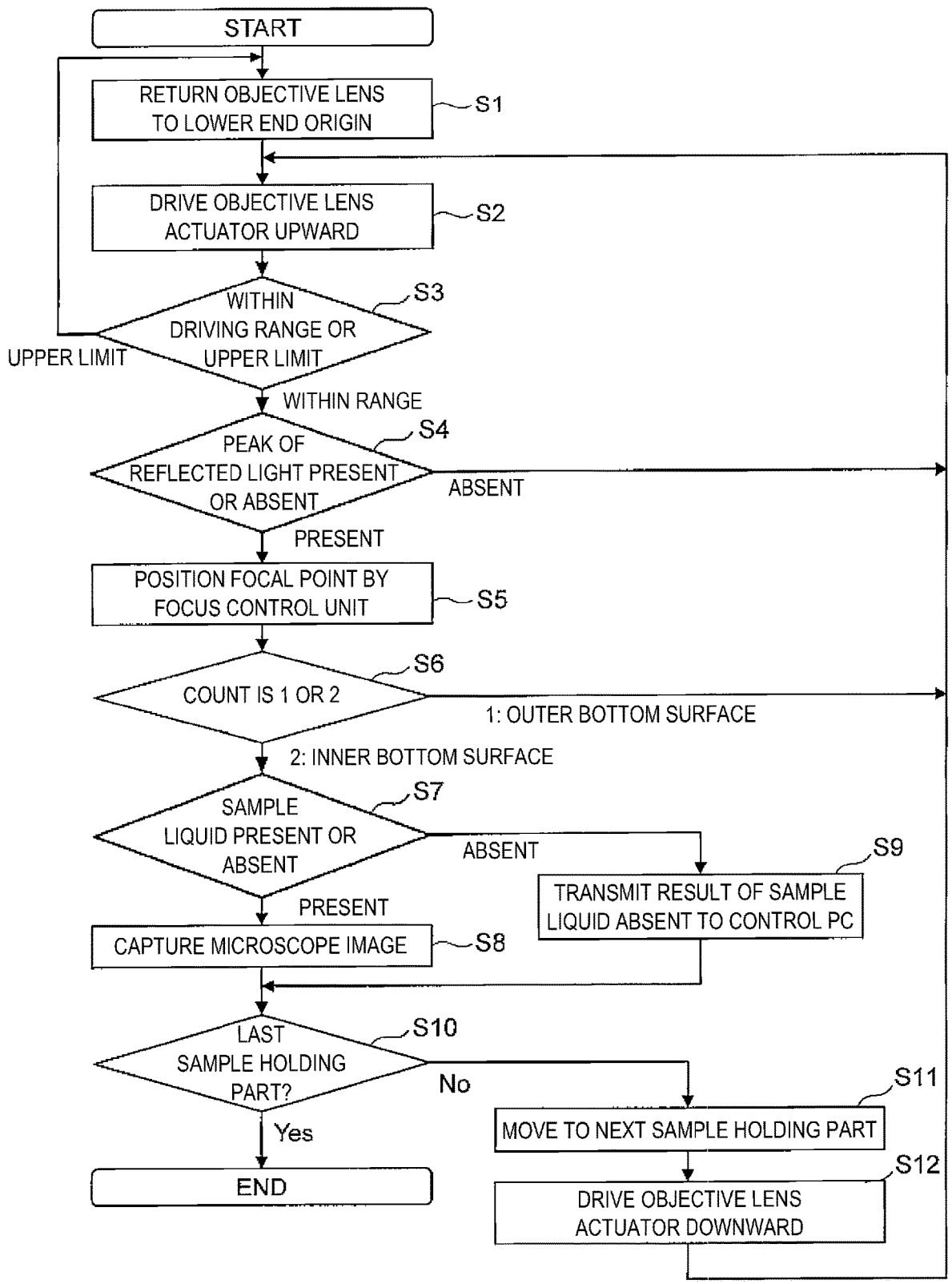

[FIG. 4]
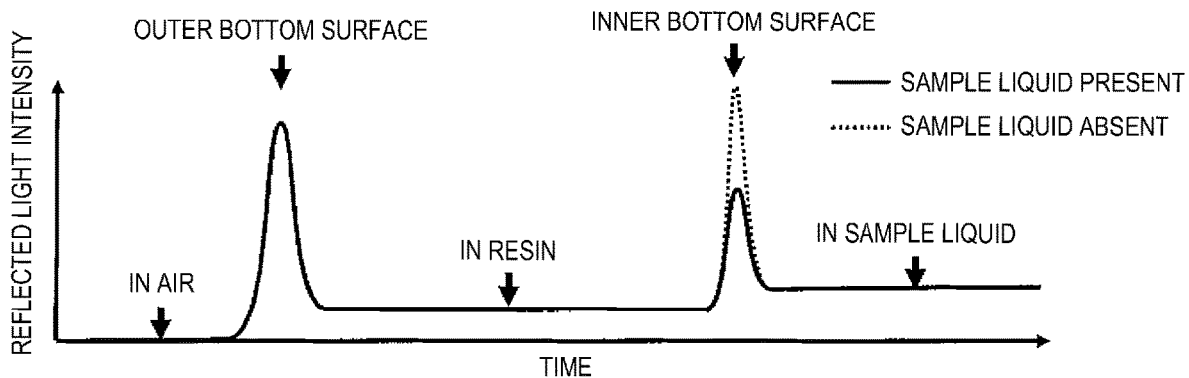
[FIG. 5A]
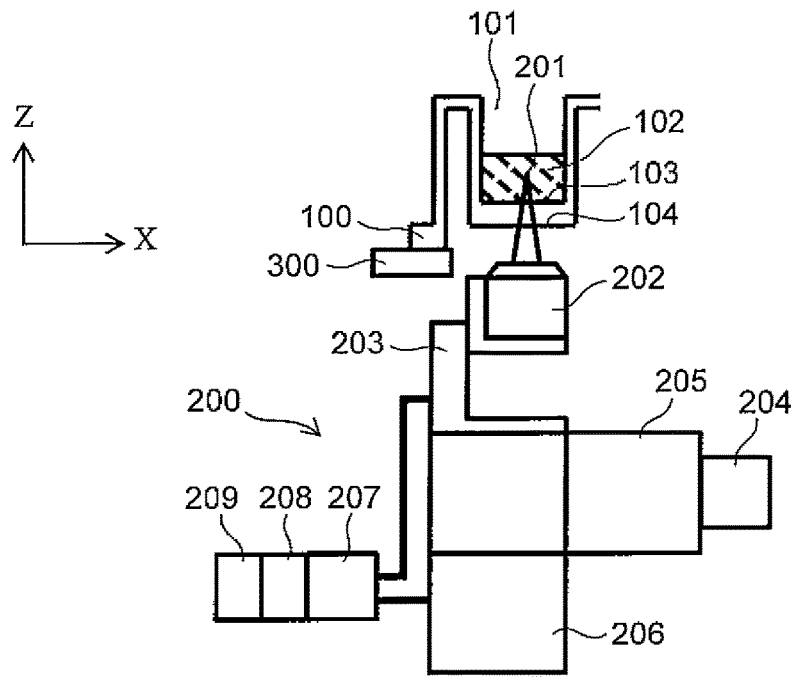

[FIG. 5B]
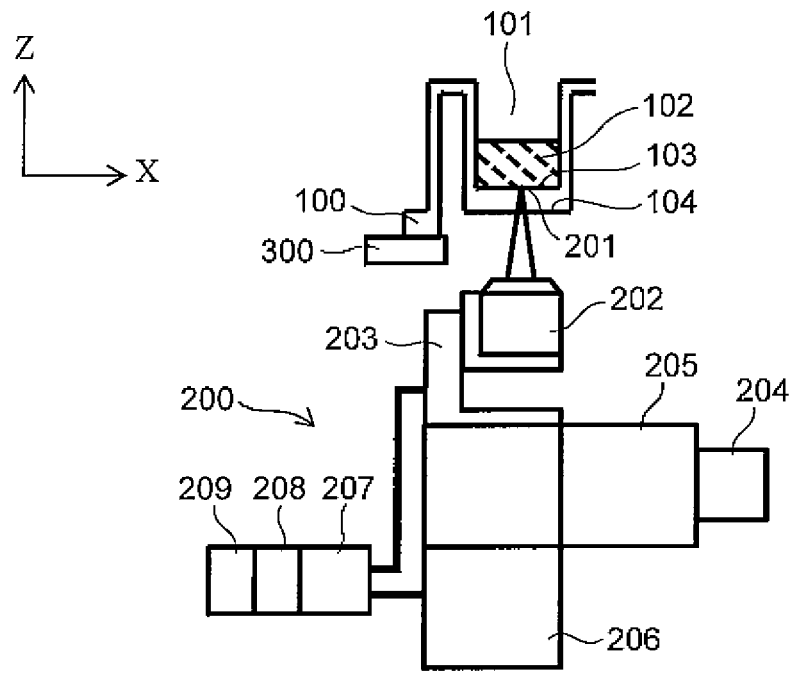
[FIG. 5C]
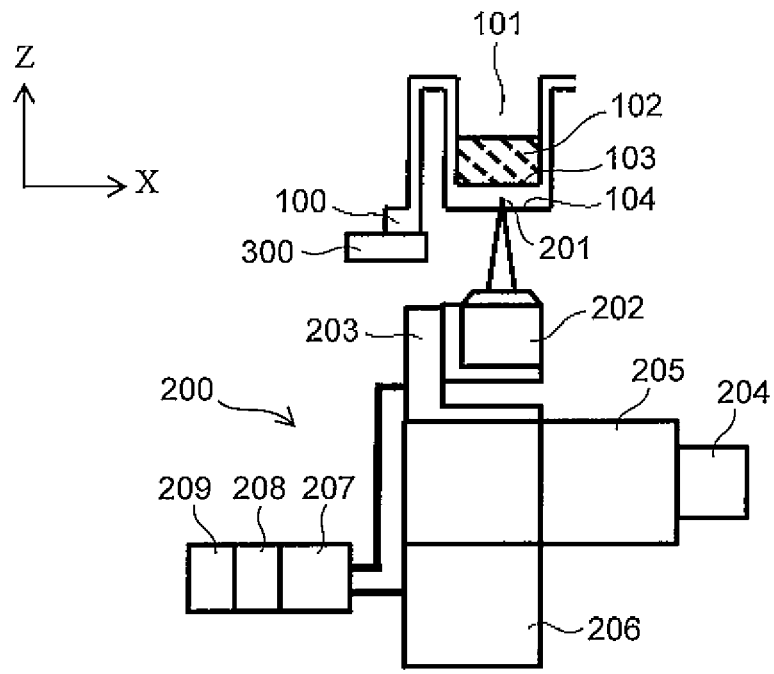

[FIG. 5D]
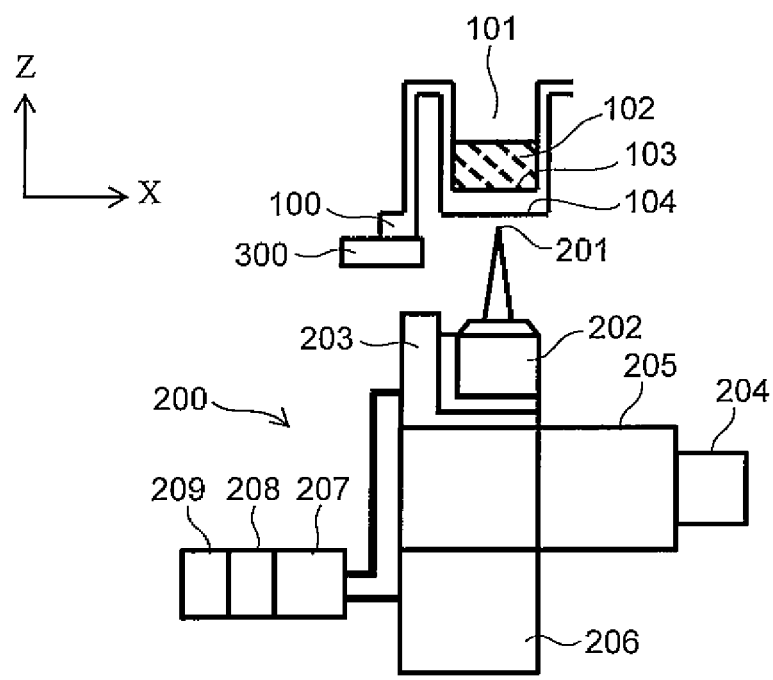

[FIG. 6]
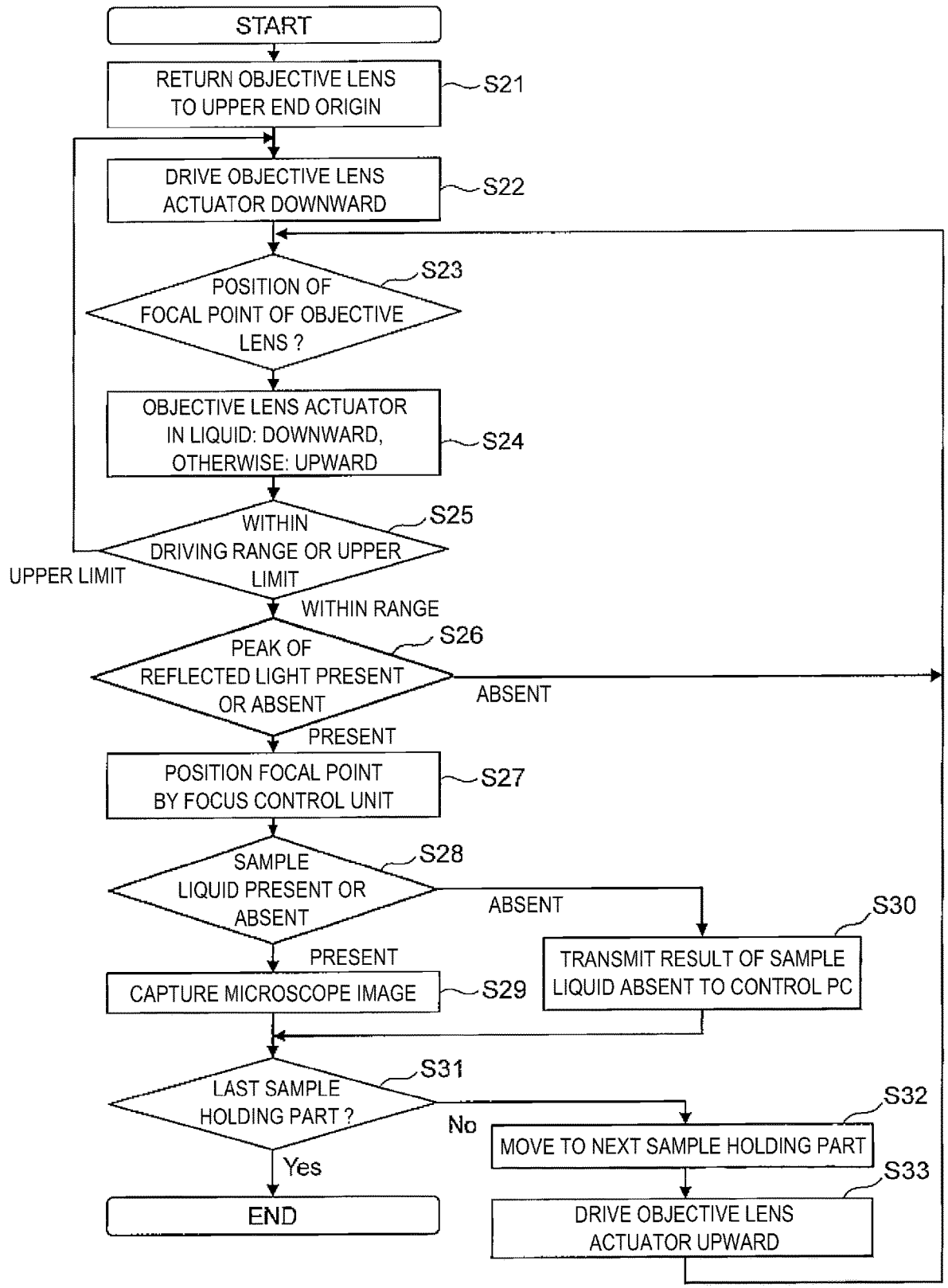

[FIG. 7]
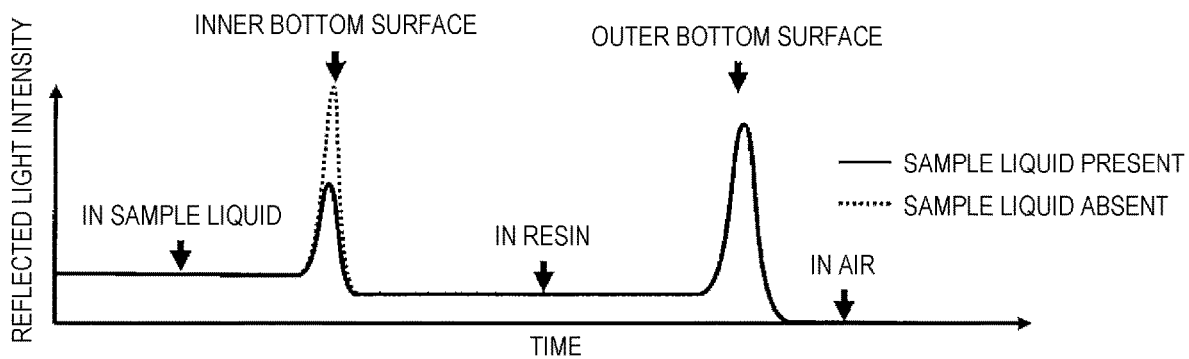

OBSERVATION DEVICE

TECHNICAL FIELD

The present invention relates to an observation device.

BACKGROUND ART

When acquiring a microscopic image of cells or the like, the cells are generally suspended in a sample liquid, and the sample liquid is stored in a transparent sample container. For this reason, an inverted microscope in which an objective lens is disposed below a sample container is generally used.

An imaging method is known as a method for observing cells in a sample liquid with a high sensitivity. Observation by the imaging method is performed using, for example, an optical microscope, a fluorescence microscope, a coherent anti-Stoke Raman scattering (CARS) microscope, or a three-dimensional optical coherence tomography (OCT).

In related art, an observation device that employs the imaging method is required to perform high speed and high precision autofocus. The autofocus method is roughly divided into two types. One is an image method in which a focal position is calculated from contrast of microscope images, and the other is an optical method in which a sample container is irradiated with light such as a laser and a focal position is calculated from reflected light.

In the autofocus by the image method, a plurality of microscope images are acquired, and a position where the contrast is maximized is calculated, so as to perform the autofocus. In this method, in order to perform the autofocus at a high speed, a program or device that calculates the contrast of the plurality of microscope images at a high speed is required, and it is difficult to improve the autofocus speed in principle. Further, this method requires an observation target whose contrast can be obtained, and when observing extremely diluted cells, autofocus could not be performed.

On the other hand, in the autofocus by the optical method, a boundary surface between the sample container and the sample liquid is irradiated with light such as a laser, and the autofocus is performed based on information of a quantity of one or several scalars, such as a position or phase of the reflected light from the boundary surface. Therefore, for example, when an image having several hundred thousand pixels is acquired, the amount of calculation is several hundred thousandth of that of the image method, and high speed autofocus can be performed.

In the autofocus by the optical method install on an inverted microscope, there are two types of reflected light of light irradiated to a bottom surface of the sample container: the reflected light from the boundary surface between an inner bottom surface of the sample container and the sample liquid, and the reflected light from the boundary surface between an outer bottom surface of the sample container and air. Therefore, a method has been adopted in which a detection range of an autofocus position is limited and only the reflected light from the boundary surface between the inner bottom surface of the sample container and the sample liquid is detected. However, when the sample container is a resin product, a formation error is large, it is necessary to widen the detection range of the autofocus position, and it is not possible to completely exclude the reflected light from the boundary surface between the outer bottom surface of the sample container and the air.

As a method to solve such a problem, for example, Patent Literature 1 discloses a method in which an anti-reflection film is attached to the outer bottom surface of the sample container to exclude the reflected light from the boundary surface between the outer bottom surface of the sample container and the air.

Further, Patent Literature 2 discloses a method in which the reflected light from the boundary surface between the inner bottom surface of the sample container and the sample liquid and the reflected light from the boundary surface between the outer bottom surface of the sample container and the air are detected, respectively, a position of the boundary surface between the inner bottom surface of the sample container and the sample liquid is calculated on the basis of each peak position, and the autofocus is performed.

CITATION LIST

Patent Literature

Patent Literature 1: JP-A-2008-267842
Patent Literature 1: JP-T-2017-187436

Technical Problem

However, in order to attach the anti-reflection film to the sample container as in Patent Literature 1, smoothness of the attachment surface is important, but the bottom surface of the sample container, which is a resin-formed product, may be curved or have scratches. As a result, there is a problem that the autofocus accuracy cannot be sufficiently obtained even by providing an anti-reflection film.

Further, in the method described in Patent Literature 2, there is a problem that it is necessary to set a wide detection range of the autofocus position so as to include a thickness of the bottom surface and the formation error of the sample container, and the accuracy of the autofocus cannot be sufficiently obtained.

Therefore, the present invention provides an observation device that uniquely performs high precision autofocus on a focal position.

SUMMARY OF THE INVENTION

In order to solve the above problems, a first aspect of an observation device according to the present invention is an observation device that captures an image at a focal position inside a sample container that stores a sample liquid, including: a holding part that holds the sample container; an optical system that captures the image at the focal position; and a computation device that controls the optical system, in which the optical system includes: an objective lens disposed below the sample container; an objective lens actuator that drives the objective lens in an optical axis direction; an irradiation unit that irradiates a bottom surface of the sample container with light; a detection unit that detects a reflected light intensity of reflected light of the light; a focus control unit that positions a focal point of the objective lens on a reflection surface imparting a peak in the reflected light intensity; and a counting unit that counts the reflection surface, the focus control unit drives the objective lens actuator to position the focal point on the reflection surface when the peak is detected in the reflected light intensity, the counting unit counts the reflection surface when the focus control unit has positioned the focal point on the reflection surface, and the computation device determines, on the basis of a count value, whether or not the focal point is positioned at the focal position, and causes the optical system to capture an image if the focal point is positioned at the focal position and to drive the objective lens actuator when the focal point is not positioned at the focal position.

Further, a second aspect of the observation device according to the present invention is an observation device that captures an image at a focal position inside a sample container that stores a sample liquid, including: a holding part that holds the sample container; an optical system that captures the image at the focal position; and a computation device that controls the optical system, in which the optical system includes: an objective lens disposed below the sample container; an objective lens actuator that scans the objective lens in an optical axis direction; an irradiation unit that irradiates a bottom surface of the sample container with light; a detection unit that detects a reflected light intensity of reflected light of the light; a focus control unit that positions a focal point of the objective lens on a reflection surface imparting a peak in the reflected light intensity; and a reflected light intensity determination unit that determines, on the basis of intensity distribution of the reflected light, a position of the focal point, the focus control unit drives the objective lens actuator to position the focal point on the reflection surface when the peak is detected in the reflected light intensity, the reflected light intensity determination unit determines, on the basis of the intensity distribution of the reflected light, whether or not the focal point is positioned at the focal position, and the computation device causes the optical system to capture an image if the focal point is positioned at the focal position and to drive the objective lens actuator when the focal point is not positioned at the focal position.

Advantageous Effect

According to the present invention, high precision autofocus can be uniquely performed on a focal position.

Further features relating to the present invention will become apparent from the statements of the description and the accompanying drawings. Further, problems, configurations, and effects other than those described above will be clarified by the descriptions of the following embodiments.

BRIEF DESCRIPTION OF DRAWINGS

FIG. 1 is a schematic perspective view showing a configuration of an observation device 1 according to a first embodiment.

FIG. 2A is a schematic diagram showing an operation of the observation device 1 according to the first embodiment.

FIG. 2B is a schematic diagram showing an operation of the observation device 1 according to the first embodiment.

FIG. 2C is a schematic diagram showing an operation of the observation device 1 according to the first embodiment.

FIG. 2D is a schematic diagram showing an operation of the observation device 1 according to the first embodiment.

FIG. 2E is a schematic diagram showing an operation of the observation device 1 according to the first embodiment.

FIG. 3 is a flowchart showing an observation method according to the first embodiment.

FIG. 4 is a graph showing an example of reflected light intensity distribution when a focal point 201 of an objective lens 202 is scanned from below to above a sample holding part 101.

FIG. 5A is a schematic diagram showing an operation of an observation device 1 according to a second embodiment.

FIG. 5B is a schematic diagram showing an operation of the observation device 1 according to the second embodiment.

FIG. 5C is a schematic diagram showing an operation of the observation device 1 according to the second embodiment.

FIG. 5D is a schematic diagram showing an operation of the observation device 1 according to the second embodiment.

FIG. 6 is a flowchart showing an observation method according to the second embodiment.

FIG. 7 is a graph showing an example of reflected light intensity distribution when the focal point 201 of the objective lens 202 is continuously scanned downward from a sample liquid 102.

DESCRIPTION OF EMBODIMENTS

Hereinafter, embodiments of the present invention will be described with reference to the drawings. Although the drawings show specific embodiments in accordance with the principles of the present invention, the drawings are for the purpose of understanding the present invention, and are not to be used for limiting interpretation of the present invention.

The embodiments of the present invention relate to an observation device and an observation method that automatically capture, by autofocus, a microscopic image at a focal position in a sample container that stores a sample liquid containing cells and fine particles. In the description, the "focal position" is a position to be observed in the sample container, and refers to an area from an inner bottom surface of the sample container to 20 μm above the inner bottom surface. Further, the "autofocus" refers to a process of automatically positioning a focal point of an objective lens at the focal position.

In the description, the "connection" of each component does not necessarily have to be physically performed by wiring or the like, and includes wireless connection.

In the following description, an XYZ orthogonal coordinate system is set. One predetermined direction in a horizontal plane is an X direction, a direction orthogonal to the X direction in the horizontal plane is a Y direction, and a direction orthogonal to each of the X and Y directions (that is, a vertical direction) is a Z direction. The Z direction is parallel to an optical axis direction of the objective lens.

First Embodiment (1) Observation Device

An observation device according to a first embodiment will be described with reference to FIG. 1. FIG. 1 is a schematic perspective view showing a configuration of an observation device 1 according to the first embodiment. As shown in FIG. 1, the observation device 1 includes an image capturing unit 200 (optical system), an XY stage 300 (holding part), and a control personal computer (PC) 400 (computation device).

The XY stage 300 holds a sample container 100. The sample container 100 is a container including a plurality of sample holding parts 101 in which a sample liquid 102 containing an observation target such as cells or fine particles is stored. As the sample container 100, as shown in FIG. 1, a 96-well microtiter plate including 96 sample holding parts 101, a 384-well plate, a 1536-well plate, and the like may be used.

The XY stage 300 is configured to be able to drive the sample container 100 in a plane (XY plane) perpendicular to the optical axis direction (Z direction) of an objective lens 202 of the image capturing unit 200. It is also possible to adopt a configuration in which the XY stage 300 drives the image capturing unit 200 in the XY plane instead of driving the sample container 100. That is, the sample container 100 and the image capturing unit 200 are configured to move relatively in the XY plane.

The image capturing unit 200 is an optical system of an inverted microscope, and includes the objective lens 202 disposed below the sample container 100, an objective lens actuator 203, a camera 204, an imaging lens 205, an autofocus unit 206, a focus control unit 207, a counting unit 208, and a reflected light intensity determination unit 209.

The objective lens actuator 203 drives the objective lens 202 in the optical axis direction in accordance with an instruction from the focus control unit 207 or the control PC 400. In the observation device 1, it is also possible to adopt a configuration in which a position of the sample container 100 is fixed and the objective lens actuator 203 drives in a three-axis direction (XYZ direction), instead of providing the XY stage 300.

The imaging lens 205 forms an image incident through the objective lens 202 on the camera 204.

The camera 204 converts the image formed on a sensor unit of the camera 204 by the imaging lens 205 into an electric signal, and captures the image as a microscope image.

Although not shown in the drawing, the image capturing unit 200 includes an adjustment mechanism that drives the imaging lens 205 or the camera 204 in order to finely adjust a surface to be imaged on the camera 204 to an arbitrary position within the focal position. The adjustment mechanism may be, for example, an actuator connected to the control PC 400 or the focus control unit 207. The adjustment mechanism, for example, drives the imaging lens 205 or the camera 204 such that an image above an inner bottom surface 103 is formed on the camera 204 after the focal point 201 of the objective lens 202 is positioned on the inner bottom surface 103.

Although not shown in the drawing, the autofocus unit 206 includes an irradiation unit that irradiates a bottom surface of each sample holding part 101 with light such as a laser, and a photodetector that detects reflected light from each sample holding part 101, and acquires a signal for performing autofocus.

The irradiation unit irradiates the bottom surface of each sample holding part 101 with light through the objective lens 202 in parallel with the optical axis direction of the objective lens 202. It is also possible to adopt a configuration in which the bottom surface of each sample holding part 101 is irradiated with light from an oblique direction with respect to the optical axis direction without passing through the objective lens 202.

The photodetector continuously detects the reflected light while the objective lens actuator 203 is driven. The photodetector is, for example, a sensor such as a photodiode. The photodetector may include an amplifier that amplifies a detection signal of the reflected light. The light detector transmits a detection signal as reflected light intensity distribution to the focus control unit 207 and the reflected light intensity determination unit 209.

The intensity distribution of the reflected light detected by the photodetector is illustrated in FIG. 4. FIG. 4 is a graph showing an example of the reflected light intensity distribution when the focal point 201 of the objective lens 202 is scanned from below to above the sample holding part 101. As shown in FIG. 4, the reflected light intensity shows a peak when the focal point 201 of the objective lens 202 is positioned on the reflection surface of the sample holding part 101, that is, when the focal point 201 is positioned on a boundary surface between the inner bottom surface 103 of the sample holding part 101 and the sample liquid 102 or a boundary surface between an outer bottom surface 104 of the sample holding part 101 and air.

The focus control unit 207 receives the reflected light intensity distribution from the autofocus unit 206, determines whether the focal point 201 is positioned on the reflection surface on which the peak of the reflected light intensity reaches an apex, and drives the objective lens actuator 203 so as to accurately position the focal point 201 on the reflection surface. When the peak of the reflected light intensity is detected, the focus control unit 207 switches a driving direction of the objective lens actuator 203, and accurately positions the focal point 201 of the objective lens 202 on the reflection surface at a low speed.

As an autofocus method by the autofocus unit 206 and the focus control unit 207, another method may be adopted, and examples thereof include a laser interferometry (phase contrast method), an astigmatism method, and a pattern projection method. The laser interferometry is a method in which autofocus is performed based on a phase difference between incident light irradiated by an irradiation unit and reflected light of the incident light. The pattern projection method is a method in which a pattern is irradiated instead of laser light, and autofocus is performed based on a phase difference from a pattern from a reflection surface.

When the focus control unit 207 positions the focal point 201 of the objective lens 202 on the reflection surface, the counting unit 208 counts the reflection surface and transmits a count value to the control PC 400.

The reflected light intensity determination unit 209 determines, on the basis of the reflected light intensity at the peak of the reflected light intensity distribution, whether the sample liquid 102 is present or absent in the sample holding part 101. The reflected light intensity is determined by a difference in refractive index between two substances forming a boundary surface. Since a greater difference in refractive index results in a greater reflectance, the reflected light intensity on the boundary surface between a resin forming the sample container 100 and the air (outer bottom surface 104) is larger than that on the boundary surface between the resin forming the sample container 100 and the sample liquid 102 (inner bottom surface 103). Therefore, when the sample liquid 102 is absent, as shown by a dotted line in FIG. 4, the reflected light intensity on the inner bottom surface 103 is equal to or larger than the reflected light intensity on the outer bottom surface 104. When the sample liquid 102 is present, as shown by a solid line in FIG. 4, the reflected light intensity on the inner bottom surface 103 is about half of the reflected light intensity when the sample liquid 102 is absent. The reflected light intensity determination unit 209 may determine whether the sample liquid 102 is present or absent by storing in advance a threshold value of the reflected light intensity for determining that the sample liquid 102 is absent in the sample holding part 101, and comparing the reflected light intensity on the inner bottom surface 103 with this threshold value. Since the refractive index changes when a material of the sample container 100 changes, the threshold value of the reflected light intensity when the sample liquid 102 is absent may be changed depending on the material of the sample container 100.

Further, the reflected light intensity determination unit 209 determines, from a height of a baseline of the reflected light intensity distribution, whether the position of the focal point 201 of the objective lens 202 is in the sample liquid 102, in the resin on the bottom surface of the sample holding part 101, or in the air. As shown in FIG. 4, the reflected light intensity differs depending on the position of the focal point 201. When the focal point 201 is in the air, the baseline of the reflected light intensity is the lowest, and when the focal point 201 is in the sample liquid 102, the baseline of the reflected light intensity is the highest. The reflected light intensity determination unit 209 can determine the position of the focal point 201 by storing in advance a range of the reflected light intensity for each position of the focal point 201 and referring to the range of the reflected light intensity. For example, the reflected light intensity when the focal point 201 is located in the sample liquid 102 is set as a first range, the reflected light intensity when the focal point 201 is located in the resin on the bottom surface of the sample holding part 101 is set as a second range, and the reflected light intensity when the focal point 201 is located in the air is set as a third range. When the intensity of the detected reflected light is in the first range, it is determined that the focal point 201 is located in the sample liquid 102.

Further, the reflected light intensity determination unit 209 determines, on the basis of a height of a baseline immediately before the peak of the reflected light intensity distribution is detected and the driving direction of the objective lens actuator 203, whether the reflection surface showing the peak of the reflected light intensity is the boundary surface between the inner bottom surface 103 of the sample holding part 101 and the sample liquid 102, or the boundary surface between the outer bottom surface 104 of the sample holding part 101 and the air.

The control PC 400 is connected to and controls the autofocus unit 206, the focus control unit 207, the counting unit 208, the reflected light intensity determination unit 209, the camera 204, and the XY stage 300. As the control PC 400, a programmable logic controller (PLC) control device, a control board, or the like may be used.

The control PC 400 receives the count value from the counting unit 208 to determine, from the count value, whether the reflection surface is the boundary surface (focal position) between the inner bottom surface 103 of the sample holding part 101 and the sample liquid 102, or the boundary surface between the outer bottom surface 104 of the sample holding part 101 and the air. The control PC 400 transmits an instruction for capturing an image of the focal position to the camera 204 when the reflection surface is determined to be the boundary surface between the inner bottom surface 103 of the sample holding part 101 and the sample liquid 102. The control PC 400 transmits an instruction to the objective lens actuator 203 to drive the objective lens 202 when the reflection surface is determined to be the boundary surface between the outer bottom surface 104 of the sample holding part 101 and the air.

The control PC 400 may include a display unit that displays an image formed on the camera 204, a graphical user interface (GUI) screen by which instructions by a user are input, a state of each configuration, results of various determinations of the observation device 1, and the like.

(2) Observation Method

Next, an observation method according to the first embodiment will be described with reference to FIGS. 2A to 2E and FIG. 3. FIGS. 2A to 2E are schematic diagrams showing operations of the observation device 1 according to the present embodiment. FIG. 3 is a flowchart showing the observation method according to the present embodiment. In FIGS. 2A to 2E, the control PC 400 is not shown. Hereinafter, a method of continuously capturing images of the focal positions of a plurality of the sample holding part 101 will be described.

A user provides the sample container 100 on the XY stage 300 and inputs an operation start instruction to the control PC 400 in advance to start an autofocus operation of the observation device 1. Here, the irradiation unit of the autofocus unit 206 starts irradiating the bottom surface of the first sample holding part 101 with light, and the light detector of the autofocus unit 206 starts detecting the reflected light. The light detector transmits the detection signal as the reflected light intensity distribution to the focus control unit 207.

FIG. 2A shows a state where the focal point 201 of the objective lens 202 is located below the outer bottom surface 104 of the sample holding part 101. First, in step S1, the control PC 400 drives the objective lens actuator 203 downward and returns the objective lens 202 to a lower end origin. As shown in FIG. 2A, the user adjusts a position of the lower end origin in advance such that the focal point 201 of the objective lens 202 is located below the outer bottom surface 104. At this time, a count of the counting unit 208 is 0.

In step S2, the control PC 400 drives the objective lens actuator 203 upward to scan the focal point 201 of the objective lens 202.

In step S3, the control PC 400 determines, while driving the objective lens actuator 203, whether the objective lens actuator 203 is within a driving range thereof or reaches an upper limit of the driving range. If the objective lens actuator 203 is within the driving range thereof, the control PC 400 continues driving the objective lens actuator 203. If the objective lens actuator 203 reaches the upper limit of the driving range, the process returns to step S1, and the control PC 400 drives the objective lens actuator 203 downward to return to the lower end origin.

In step S4, while the objective lens actuator 203 is driven upward, the focus control unit 207 determines, on the basis of the reflected light intensity distribution received from the photodetector, whether the peak of the reflected light intensity is present or absent. If the peak of the reflected light intensity is not detected, the process returns to step S2.

FIG. 2B shows a state where the focal point 201 of the objective lens 202 is positioned on the outer bottom surface 104 of the sample holding part 101. When the focal point 201 of the objective lens 202 is positioned on the outer bottom surface 104 of the sample holding part 101, the reflected light intensity imparts a peak as shown in FIG. 4. When the peak of the reflected light intensity is detected in step S4, in step S5, the focus control unit 207 drives the objective lens actuator 203 to accurately position the focal point 201 on the outer bottom surface 104. This is because the objective lens actuator 203 is driven even when detecting that the reflected light intensity imparts a peak, so that the focal point 201 of the objective lens 202 moves above the outer bottom surface 104.

After the focus control unit 207 accurately positions the focal point 201 on the outer bottom surface 104, the counting unit 208 adds 1 to the count and transmits the count value to the control PC 400. As shown in FIG. 2B, since the outer bottom surface 104 is a reflection surface on which the focal point 201 is positioned for the first time after the autofocus operation is started, the count is 1.

In step S6, the control PC 400 determines, from the count value, whether the reflection surface on which the focal point 201 is positioned is the outer bottom surface 104 or the inner bottom surface 103. As shown in FIG. 2B, when the count is 1, the focal point 201 is positioned on the outer bottom surface 104. In this case, the process returns to step S2, the control PC 400 drives the objective lens actuator 203 upward again, and scans the focal point 201 upward. FIG. 2C shows a state where the focal point 201 of the objective lens 202 is moved above the outer bottom surface 104 of the sample holding part 101. Then, steps S3 and S4 are performed.

FIG. 2D shows a state where the focal point 201 of the objective lens 202 is positioned on the inner bottom surface 103 of the sample holding part 101. When the focal point 201 of the objective lens 202 is positioned on the inner bottom surface 103 of the sample holding part 101, the reflected light intensity imparts a peak as shown in FIG. 4. At this time, in step S5, the focus control unit 207 drives the objective lens actuator 203 to accurately position the focal point 201 on the inner bottom surface 103. This is because the objective lens actuator 203 is driven even when detecting that the reflected light intensity peaks, so that the focal point 201 of the objective lens 202 moves above the inner bottom surface 103.

After positioning the focal point 201 on the inner bottom surface 103, the counting unit 208 adds 1 to the count and transmits the count value to the control PC 400. As shown in FIG. 2D, since the inner bottom surface 103 is a reflection surface on which the focal point 201 is positioned for the second time after the autofocus operation is started, the count is 2.

In step S6, the control PC 400 determines, on the basis of the count value, whether the reflection surface on which the focal point 201 is positioned is the outer bottom surface 104 or the inner bottom surface 103.

When the count is 2, as shown in FIG. 2D, the focal point 201 is positioned on the inner bottom surface 103. In this case, the control PC 400 transmits an instruction to the reflected light intensity determination unit 209, and the reflected light intensity determination unit 209 determines, from the reflected light intensity on the inner bottom surface 103, whether the sample liquid 102 is present or absent in the sample holding part 101. The reflected light intensity determination unit 209 determines whether the sample liquid 102 is present or absent by storing in advance a threshold value of the reflected light intensity for determining that the sample liquid 102 is absent in the sample holding part 101, and comparing the reflected light intensity on the inner bottom surface 103 with this threshold value.

When the sample liquid 102 is present, the reflected light intensity determination unit 209 transmits a result to the control PC 400. Then, in step S8, the control PC 400 transmits an instruction to the camera 204, and the camera 204 captures a microscope image of the focal position. Here, if the cells in the sample liquid 102 are thick, the microscopic image may be out of focus. Therefore, the control PC 400 transmits an instruction to the adjustment mechanism and finely adjusts the position of the camera 204 or the imaging lens 205 so that an image above the focal point 201 of the objective lens 202 is formed on the camera 204.

When the sample liquid 102 is absent, the reflected light intensity determination unit 209 transmits a result to the control PC 400 in step S9. At this time, the control PC 400 may display on a display unit as a warning that there is no sample liquid 102.

After step S8 or S9, in step S10, the control PC 400 determines whether or not the observed sample holding part 101 is the last sample holding part 101. Whether or not the observed sample holding part 101 is the last sample holding part 101 may be determined by storing the number of sample holding parts 101 in the control PC 400 in advance. If the observed sample holding part 101 is the last sample holding part 101 (Yes), the control PC 400 ends the observation.

If the observed sample holding part 101 is not the last sample holding part 101 (No), in step S11, the control PC 400 drives the XY stage 300 to move the next sample holding part 101 above the objective lens 202.

In step S12, the control PC 400 drives the objective lens actuator 203 downward to move the focal point 201 downward by a predetermined distance. At this time, the distance for moving the focal point 201 is preferably smaller than a thickness of the bottom surface of the sample holding part 101. The thickness of the bottom surface of the sample holding part 101 and the distance for driving the objective lens actuator 203 downward in step S12 are stored in the control PC 400 in advance. As a result, as shown in FIG. 2C, when the autofocus of the second and subsequent sample holding parts 101 is started, the focal point 201 is located in the resin on the bottom surface of the sample holding part 101.

After that, the process returns to step S2, and steps S2 and S3 are performed in the same manner as described above. When the peak of the reflected light intensity is detected in step S4, in step S5, the focus control unit 207 drives the objective lens actuator 203 to accurately position the focal point 201 on the reflection surface. Since the focal point 201 is moved downward by a distance smaller than the thickness of the bottom surface of the sample holding part 101 in step S12 described above, as shown in FIG. 2D, the reflection surface showing the peak of the reflected light intensity is the inner bottom surface 103. Therefore, in the observation of the second and subsequent sample holding parts 101, the counting unit 208 does not count. Therefore, the count value remains 2.

Since the count is 2 in step S6, the control PC 400 determines that the focal point 201 is positioned on the inner bottom surface 103, and performs the steps after step S7 in the same manner as described above. As described above, steps S2 to S12 (FIGS. 2C and 2D) are repeated for all the second and subsequent sample holding parts 101, and the observation is completed.

If the thickness of the bottom surface of each of the sample holding part 101 has a large variation, the focal point 201 may not be located in the resin on the bottom surface of each sample holding part 101 when moving to the next sample holding part 101 and moving the focal point 201 downward by the predetermined distance in steps S11 and S12 described above. FIG. 2E shows a state where the focal point 201 of the objective lens 202 is located above the inner bottom surface 103 of the sample holding part 101. Further, as shown in FIG. 2A, the position of the focal point 201 may be below the outer bottom surface 104 of the sample holding part 101. Therefore, after step S11 and step S12, it is preferable that the reflected light intensity determination unit 209 determines, on the basis of the height of the baseline of the reflected light intensity distribution, the position of the focal point 201.

When the position of the focal point 201 is below the outer bottom surface 104 of the sample holding part 101, the control PC 400 resets the count of the counting unit 208 and performs steps S2 to S10 in the same manner as the first sample holding part 101 to perform observation.

When the position of the focal point 201 is above the inner bottom surface 103 of the sample holding part 101, the control PC 400 drives the objective lens actuator 203 to an upper end of the driving range, and confirms, from the reflected light intensity distribution, that there are no reflection surfaces. After that, the control PC 400 resets the count of the counting unit 208, returns the process to step S1, returns the objective lens actuator 203 to the lower end origin, and performs steps S2 to S10 in the same manner as the first sample holding part 101 to observe.

As described above, in the observation method in the present embodiment, an example has been described in which the counting unit 208 counts the reflection surface only in the first sample holding part 101, but it is also possible to adopt a method of resetting the count each time the observation of one sample holding part 101 is completed and counting the reflection surfaces in the observation of all the sample holding parts 101. In this case, in the second and subsequent sample holding parts 101, the states shown in FIGS. 2C and 2D are repeated, and the control PC 400 determines that the focal point 201 is positioned on the inner bottom surface 103 when the count is 1.

Further, in the observation method in the present embodiment, an example has been described in which the focal point 201 of the objective lens 202 is scanned from below to above the outer bottom surface 104 of the sample holding part 101, but it is also possible to adopt a configuration in which scanning is performed from above the inner bottom surface 103. That is, the autofocus operation also can be started from the state shown in FIG. 2E. In this case, as shown in FIG. 2C, the reflection surface on which the peak of the reflected light intensity is first detected after starting the autofocus operation is the inner bottom surface 103. Therefore, when the count by the counting unit 208 is 1, the control PC 400 determines that the focal point 201 is positioned on the inner bottom surface 103, and causes the camera 204 to capture an image of the focal position.

As described above, the present embodiment adopts a configuration that counts the reflection surface on which the peak of the reflected light intensity is detected and determines whether the focal point 201 of the objective lens 202 is positioned on the inner bottom surface 103 (focal position) based on the count value. As a result, the autofocus to the focal position can be uniquely performed with high accuracy. Further, the present embodiment has a configuration that determines whether the sample liquid 102 is present or absent in each sample holding part 101, so that it is possible to prevent the output of an erroneous inspection result due to a human error.

Second Embodiment (1) Observation Device

As an observation device according to the second embodiment, the same observation device as the observation device 1 according to the first embodiment can be used, and thus the description thereof will be omitted.

(2) Observation Method

An observation method according to the second embodiment will be described with reference to FIGS. 5A to 5D, FIG. 6, and FIG. 7. FIGS. 5A to 5D are schematic diagrams showing operations of the observation device 1 according to the second embodiment. The control PC 400 is not shown in FIGS. 5A to FIG. 6 is a flowchart showing the observation method according to the present embodiment. FIG. 7 is a graph showing an example of reflected light intensity distribution when the focal point 201 of the objective lens 202 is continuously scanned downward from inside the sample liquid 102. The observation method according to the second embodiment differs from the first embodiment in that the position of the focal point 201 is determined by the reflected light intensity determination unit 209 to perform autofocus without counting by the counting unit 208, and the focal point 201 of the objective lens 202 is scanned from above to below the inner bottom surface 103 of each sample holding part 101.

A user provides the sample container 100 on the XY stage 300 and inputs an operation start instruction to the control PC 400 in advance to start an autofocus operation of the observation device 1. Here, the irradiation unit of the autofocus unit 206 starts irradiating the bottom surface of the first sample holding part 101 with light, and the light detector of the autofocus unit 206 starts detecting the reflected light. The light detector transmits the detected reflected light as reflected light intensity distribution to the focus control unit 207 and the reflected light intensity determination unit 209.

FIG. 5A shows a state where the focal point 201 of the objective lens 202 is located above the inner bottom surface 103 of the sample holding part 101. First, in step S21, the control PC 400 drives the objective lens actuator 203 upward and returns the objective lens 202 to an upper end origin. As shown in FIG. 5A, the user adjusts a position of the upper end origin in advance so that the focal point 201 of the objective lens 202 is located above the inner bottom surface 103.

In step S22, the control PC 400 drives the objective lens actuator 203 downward to scan the focal point 201 of the objective lens 202.

In step S23, the reflected light intensity determination unit 209 determines, on the basis of the reflected light intensity distribution received from the light detector of the autofocus unit 206, whether the focal point 201 of the objective lens 202 is located in the sample liquid 102, in the resin on the bottom surface of the sample holding part 101, or in the air. As shown in FIG. 7, the reflected light intensity differs depending on the position of the focal point 201. When the focal point 201 is in the air, the baseline of the reflected light intensity is the lowest, and when the focal point 201 is in the sample liquid 102, the baseline of the reflected light intensity is the highest. The reflected light intensity determination unit 209 determines the position of the focal point 201 by storing in advance a range of the reflected light intensity for each position of the focal point 201 and referring to the range of the reflected light intensity. As shown in FIG. 7, immediately after the autofocus operation is started, since the focal point 201 is located in the sample liquid 102, the baseline of the reflected light intensity is the highest. The reflected light intensity determination unit 209 transmits the determined position of the focal point 201 to the control PC 400. The position of the focal point 201 of the objective lens 202 may be determined by the control PC 400 from the image acquired by the camera 204.

In step S24, the control PC 400 determines the driving direction of the objective lens actuator 203 on the basis of the position of the focal point 201 determined by the reflected light intensity determination unit 209 or the image acquired by the camera 204. When the focal point 201 is located in the sample liquid 102, the control PC 400 continues driving the objective lens actuator 203 downward. When the focal point 201 is located in the resin on the bottom surface of the sample holding part 101 or the air, the control PC 400 switches the driving direction of the objective lens actuator 203 and drives upward.

In step S25, the control PC 400 determines, while driving the objective lens actuator 203, whether the objective lens actuator 203 is within a driving range thereof or reaches a lower limit of the driving range. If the objective lens actuator 203 is within the driving range thereof, the control PC 400 continues driving the objective lens actuator 203. If the objective lens actuator 203 reaches the lower limit of the driving range, the process returns to step S22, and the control PC 400 drives the objective lens actuator 203 upward to return to the upper end origin, and then drives downward.

In step S26, while the objective lens actuator 203 is driven, the focus control unit 207 determines, on the basis of the reflected light intensity distribution received from the photodetector, whether the peak of the reflected light intensity is present or absent. If no peaks of the reflected light intensity are detected, the process returns to step S23.

If the peak of reflected light intensity is detected, the reflected light intensity determination unit 209 determines, on the basis of the reflected light intensity distribution and from a height of a baseline immediately before the peak is detected, the position of the focal point 201 to determine whether the detected peak is due to the inner bottom surface 103 or the outer bottom surface 104. When determining from the height of the baseline immediately before the peak is detected that the focal point 201 is located in the sample liquid 102, since the objective lens actuator 203 is driven downward, it is determined that the detected peak is due to the inner bottom surface 103. When determining from the height of the baseline immediately before the peak is detected that the focal point 201 is located in the resin on the bottom surface of the sample holding part 101, since the objective lens actuator 203 is driven upward, it is determined that the detected peak is due to the inner bottom surface 103. When determining from the height of the baseline immediately before the peak is detected that the focal point 201 is located in the air, since the objective lens actuator 203 is driven upward, it is determined that the detected peak is due to the outer bottom surface 104. When it is determined that the detected peak is due to the outer bottom surface 104, the process returns to step S23.

When the peak of the reflected light intensity due to the inner bottom surface 103 is detected, in step S27, the focus control unit 207 drives the objective lens actuator 203 to accurately position the focal point 201 on the inner bottom surface 103. This is because the objective lens actuator 203 is driven even when detecting that the reflected light intensity imparts a peak, so that the focal point 201 of the objective lens 202 moves below the inner bottom surface 103. FIG. 5B shows a state where the focal point 201 of the objective lens 202 is positioned above the inner bottom surface 103 of the sample holding part 101.

After positioning the focal point 201 on the inner bottom surface 103, in step S28, the focus control unit 207 transmits an instruction to the reflected light intensity determination unit 209. At this time, the reflected light intensity determination unit 209 determines, from the reflected light intensity on the inner bottom surface 103, whether the sample liquid 102 in the sample holding part 101 is present or absent. The reflected light intensity determination unit 209 determines whether the sample liquid 102 is present or absent by storing in advance a threshold value of the reflected light intensity for determining that the sample liquid 102 is absent in the sample holding part 101, and comparing the reflected light intensity on the inner bottom surface 103 with this threshold value.

When the sample liquid 102 is present, the reflected light intensity determination unit 209 transmits a result to the control PC 400. In step S29, the control PC 400 transmits an instruction to the camera 204, and the camera 204 captures a microscope image of the focal position. Here, if the cells in the sample liquid 102 are thick, the microscopic image may be out of focus. Therefore, the control PC 400 transmits an instruction to the adjustment mechanism and finely adjusts the position of the camera 204 or the imaging lens 205 so that an image above the focal point 201 of the objective lens 202 is formed on the camera 204.

When the sample liquid 102 is absent, the reflected light intensity determination unit 209 transmits a result to the control PC 400 in step S30. The control PC 400 may display on a display unit as a warning that there is no sample liquid 102.

After step S29 or S30, in step S31, the control PC 400 determines whether or not the observed sample holding part 101 is the last sample holding part 101. Whether or not the observed sample holding part 101 is the last sample holding part 101 may be determined by storing the number of sample holding parts 101 in the control PC 400 in advance. If the observed sample holding part 101 is the last sample holding part 101 (Yes), the control PC 400 ends the observation.

If the observed sample holding part 101 is not the last sample holding part 101 (No), in step S32, the control PC 400 drives the XY stage 300 to move the next sample holding part 101 above the objective lens 202.

In step S33, the control PC 400 drives the objective lens actuator 203 upward to move the focal point 201 upward by a predetermined distance. At this time, the distance for moving the focal point 201 is preferably smaller than a height of the sample liquid 102. The height of the sample liquid 102 and the distance for driving the objective lens actuator 203 upward in step S33 are stored in the control PC 400 in advance. As a result, as shown in FIG. 5A, when the autofocus of the second and subsequent sample holding parts 101 is started, the focal point 201 is located in the sample liquid 102.

After that, the process returns to step S23, and steps S23 to S33 are performed for the second and subsequent sample holding parts 101 in the same manner as described above.

If the thickness of the bottom surface of the sample container 100 has a large variation, the position of the focal point 201 may be in the resin on the bottom surface of the sample holding part 101 or below the outer bottom surface 104 when moving to the next sample holding part 101 and moving the focal point 201 upward by the predetermined distance in steps S32 and S33 described above. FIG. 5C shows a state where the focal point 201 of the objective lens 202 is located in the resin on the bottom surface of the sample holding part 101. FIG. 5D shows a state where the focal point 201 of the objective lens 202 is located below the outer bottom surface 104 of the sample holding part 101.

Thus, after step S32 and step S33, the process returns to step S23 even if the focal point 201 is not located in the sample liquid 102.

As described above, in the observation method in the present embodiment, an example has been described in which the focal point 201 of the objective lens 202 is scanned downward from inside the sample liquid 102 of each sample holding part 101, it is also possible to adopt a configuration in which the focal point 201 is scanned from below the outer bottom surface 104.

Further, the observation method in the present embodiment can be carried out in combination with the first embodiment. For example, steps S23 and S24 of the present embodiment may be performed between steps S3 and S4 of the first embodiment.

(3) Technical Effect

As described above, the present embodiment adopts a configuration that determines, form the reflected light intensity distribution, the position of the focal point 201 of the objective lens 202 to determine the driving direction of the objective lens actuator 203, and positions the focal point 201 on the inner bottom surface 103 (focal position). As a result, the autofocus to the focal position can be uniquely performed with high accuracy. Further, the present embodiment has a configuration that determines whether the sample liquid 102 in each sample holding part 101 is present or absent, so that it is possible to prevent the output of an erroneous inspection result due to a human error.

REFERENCE SIGNS LIST 100 sample container
101 sample holding part
102 sample liquid
103 inner bottom surface
104 outer bottom surface
200 image capturing unit
201 focal point
202 objective lens
203 objective lens actuator
204 camera
205 imaging lens
206 autofocus unit
207 focus control unit
208 counting unit
209 reflected light intensity determination unit
300 XY stage
400 control PC

The invention claimed is:

1. An observation device that captures an image at a focal position inside a sample container that stores a sample liquid, the observation device comprising:
a holding part that holds the sample container;
an optical system that captures the image at the focal position; and
a computer that is coupled to the optical system and that controls the optical system,
wherein the optical system includes:
an objective lens disposed below the sample container;
an objective lens actuator that drives the objective lens in an optical axis direction;
a laser that irradiates the sample container with light;
a photodetector that detects a reflected light intensity of reflected light of the light;
a focus control unit coupled to the objective lens actuator that positions a focal point of the objective lens on a reflection surface imparting a peak in the reflected light intensity;
an incremental counter coupled to the focus control unit; and
a reflected light intensity determination unit coupled to the incremental counter, that determines, based on an intensity distribution of the reflected light, a position of the focal point;
wherein the computer determines, on a basis of the position of the focal point of the objective lens determined by the reflected light intensity determination unit, a driving direction of the objective lens actuator,
wherein the focus control unit drives the objective lens actuator to position the focal point on the reflection surface upon determining the peak is detected in the reflected light intensity,
wherein the incremental counter increments a count after the focus control unit has positioned the focal point on the reflection surface, and
wherein the computer:
determines, based on a count value of the count, whether the focal point is positioned at the focal position, and
causes the optical system to capture an image upon determining the focal point is positioned at the focal position and causes the focus control unit to drive the objective lens actuator upon determining the focal point is not positioned at the focal position.

2. The observation device according to claim 1, wherein the reflected light intensity determination unit determines, on the basis of the reflected light intensity at the peak, whether the sample liquid is present in the sample container upon determining the focal point is determined to be positioned at the focal position.

3. The observation device according to claim 1, wherein the optical system further includes a camera that captures the image at the focal position and an imaging lens that forms the image at the focal position on the camera.

4. The observation device according to claim 3, further comprising:
an adjustment mechanism that drives the camera or the imaging lens to adjust the image at the focal position formed on the camera.

5. The observation device according to claim 1, wherein the objective lens actuator starts driving and drives upward from a state where the focal point of the objective lens is located below a bottom surface of the sample container, and
wherein the computer determines that the focal point is positioned at the focal position upon determining the count value is 2.

6. The observation device according to claim 1, wherein the objective lens actuator starts driving and drives downward from a state where the focal point of the objective lens is located in the sample liquid, and
wherein the computer determines that the focal point is positioned at the focal position upon determining the count value is 1.

7. The observation device according to claim 1, wherein the reflected light intensity determination unit determines, based on a reflected light intensity baseline immediately before the peak of the reflected light intensity is detected, the position of the focal point.

* * * * *